(12) United States Patent
Rothera et al.

(10) Patent No.: US 10,999,415 B2
(45) Date of Patent: *May 4, 2021

(54) CREATING A CINEMATIC STORYTELLING EXPERIENCE USING NETWORK-ADDRESSABLE DEVICES

(71) Applicant: Google LLC, Mountain View, CA (US)

(72) Inventors: Alexander Rothera, Chicago, IL (US); Scott D. Lange, Birmingham, MI (US); Jennifer Drop, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,790

(22) Filed: Nov. 19, 2018

(65) Prior Publication Data

US 2019/0158632 A1 May 23, 2019

Related U.S. Application Data

(63) Continuation of application No. 15/289,806, filed on Oct. 10, 2016, now Pat. No. 10,135,950.

(51) Int. Cl.
*H04L 29/06* (2006.01)
*G10L 15/00* (2013.01)
(Continued)

(52) U.S. Cl.
CPC .............. *H04L 67/42* (2013.01); *G06F 40/00* (2020.01); *G10L 15/00* (2013.01); *H04L 67/10* (2013.01);
(Continued)

(58) Field of Classification Search
CPC ......... G06F 40/00; G10L 15/00; G10L 15/26; H04L 67/10; H04L 67/306; H04L 67/42; H04M 2201/40; H04M 3/4938
See application file for complete search history.

(56) References Cited

U.S. PATENT DOCUMENTS 9,368,105 B1 * 6/2016 Freed ...................... G10L 15/22
9,914,057 B2 * 3/2018 Muhlheim .............. A63F 13/06
(Continued)

FOREIGN PATENT DOCUMENTS

CN 102193903 A 9/2011
CN 103657087 A 3/2014
(Continued)

OTHER PUBLICATIONS

PCT International Search Report and Written Opinion for International Application No. PCT/U2017/054623, dated Dec. 15, 2017, 8 pages.
(Continued)

*Primary Examiner* — Jerry B Dennison

(74) *Attorney, Agent, or Firm* — Lowenstein Sandler LLP

(57) ABSTRACT

A computer-implemented method to create a cinematic storytelling experience is provided. The method includes receiving, from a client device, a user selection of a story, and obtaining, from a server, (i) a lexicon associated with the selected story, the lexicon comprising a limited number of keywords, and (ii) instructions associated with the selected story, the instructions including instructions to perform at least one action responsive to the client device detecting a keyword. The method further includes receiving user input to initiate verbal recitation of the selected story, detecting correspondence between the verbal recitation and at least one of the keywords, and performing the at least one action according to the instructions for the at least one keyword.

20 Claims, 4 Drawing Sheets

(51) Int. Cl.
*G06F 40/00* (2020.01)
*H04L 29/08* (2006.01)
*H04M 3/493* (2006.01)
*G10L 15/26* (2006.01)

(52) U.S. Cl.
CPC ............ *G10L 15/26* (2013.01); *H04L 67/306* (2013.01); *H04M 3/4938* (2013.01); *H04M 2201/40* (2013.01)

(56) References Cited

U.S. PATENT DOCUMENTS

| | | | |
|---|---|---|---|
| 10,004,984 B2* | 6/2018 | Voris | A63F 13/52 |
| 2009/0198357 A1* | 8/2009 | Logan | H04N 21/6582 |
| | | | 700/94 |
| 2011/0222788 A1 | 9/2011 | Tsunokawa et al. | |
| 2012/0017150 A1* | 1/2012 | Pollack | H04N 5/76 |
| | | | 715/716 |
| 2012/0223885 A1* | 9/2012 | Perez | A63F 13/52 |
| | | | 345/458 |
| 2013/0030785 A1 | 1/2013 | Satterfield et al. | |
| 2013/0179165 A1 | 7/2013 | Holman et al. | |
| 2013/0307856 A1* | 11/2013 | Keane | G06F 3/1415 |
| | | | 345/473 |
| 2014/0008010 A1 | 1/2014 | Kitabata et al. | |
| 2014/0019197 A1 | 1/2014 | Noyes | |
| 2014/0062679 A1* | 3/2014 | Markov | G08C 17/02 |
| | | | 340/12.22 |
| 2014/0080109 A1 | 3/2014 | Haseltine et al. | |
| 2014/0191976 A1 | 7/2014 | Peevers et al. | |
| 2015/0149403 A1* | 5/2015 | Sullivan | H04W 4/06 |
| | | | 707/603 |
| 2015/0235656 A1* | 8/2015 | Kim | G10L 15/28 |
| | | | 455/563 |
| 2016/0017176 A1 | 1/2016 | Wonnemann | |
| 2016/0171767 A1 | 6/2016 | Anderson | |
| 2016/0225187 A1* | 8/2016 | Knipp | G06T 19/006 |
| 2016/0234184 A1* | 8/2016 | Liu | G06F 16/433 |
| 2016/0234595 A1* | 8/2016 | Goran | H04L 12/2827 |
| 2016/0261931 A1* | 9/2016 | Fadell | G08C 17/02 |
| 2016/0373504 A1* | 12/2016 | Moncomble | H04L 65/601 |
| 2017/0108236 A1* | 4/2017 | Guan | G05B 15/02 |
| 2017/0109391 A1* | 4/2017 | Rosen | G06Q 10/1093 |
| 2018/0103122 A1* | 4/2018 | Rothera | G10L 15/00 |
| 2018/0117465 A1* | 5/2018 | Voris | A63F 13/26 |

FOREIGN PATENT DOCUMENTS

| | | |
|---|---|---|
| CN | 105022487 A | 11/2015 |
| CN | 105335455 A | 2/2016 |

OTHER PUBLICATIONS

Fox, M., "This vibrator syncs up with erotic audiobooks, so your commute just got a lot more interesting," Someecards, Inc., Oct. 4, 2016, 5 Pages, [online] [Retrieved on Jan. 9, 2017] Retrieved from the Internet <URL:http://www.someecards.com/love/sex/erotic-audiobook-with-vibrator/>.

Golson, J., "iOS 5 Allows You to Tap Out Custom Vibration Patterns," MacRumors.com, Jun. 8, 2011, 3 Pages, [online] [Retrieved on Jan. 9, 2017] Retrieved from the internet <URL:http://www.macrumors.com/2011/06/08/ios-5-allows-you-to-tap-out-custom-vibration-patterns/>.

Smith, J., "Xbox One+ Philips Hue LEDs= Technicolor madness (and one awesome apartment)," Digital Trends, Nov. 19, 2015, 5 Pages, [online] [Retrieved on Jan. 9, 2017] Retrieved from the internet <URL:http://www.digitaltrends.com/gaming/philips-hue-xbox-one-integration/>.

PCT International Search Report and Written Opinion for International Application No. PCT/US2017/054623 dated Dec. 15, 2017, 8 pages.

European Patent Application No. 17860749.5, Extended European Search Report dated Apr. 23, 2020, 5 pages.

Chinese Patent Application No. 201780069037.1, Office Action Search Report dated Nov. 6, 2019, 12 pages.

* cited by examiner

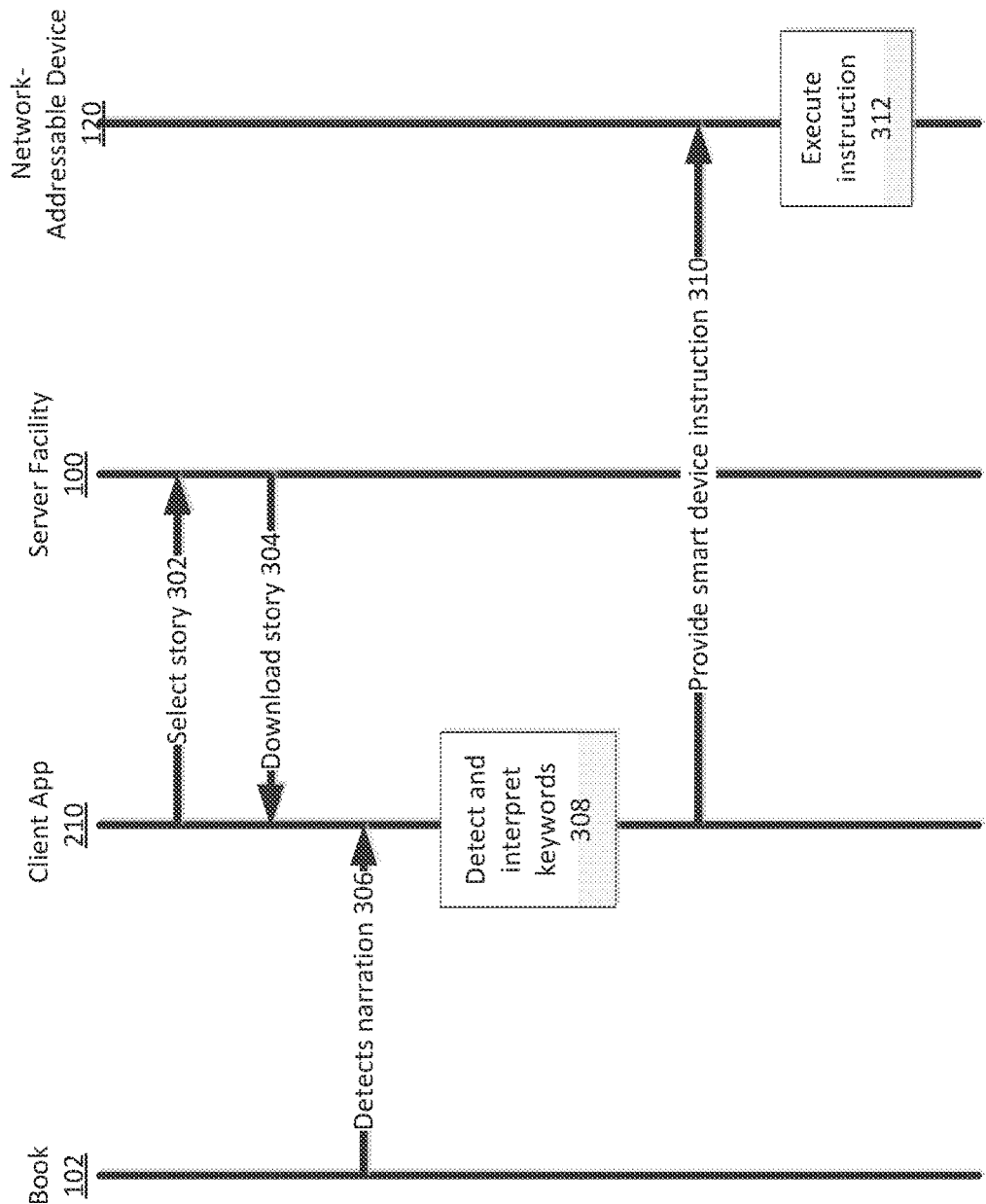

CREATING A CINEMATIC STORYTELLING EXPERIENCE USING NETWORK-ADDRESSABLE DEVICES

RELATED APPLICATIONS

This application is a continuation application of co-pending U.S. patent application Ser. No. 15/289,806, filed Oct. 10, 2016, entitled, "CREATING A CINEMATIC STORYTELLING EXPERIENCE USING NETWORK-ADDRESSABLE DEVICES," which is herein incorporated by reference.

BACKGROUND

1. Technical Field

The disclosure generally relates to the field of voice recognition, and in particular, to detecting user input of keywords corresponding to coordination instructions and instructing network-addressable devices to carry out those instructions to create a cinematic storytelling experience.

2. Background Information

Network-addressable or "smart home" devices are electronic devices connected to a network that can be controlled through other internet-connected devices, such as smartphones or tablets. These devices have emerged in recent years as a convenient and efficient way for consumers to control the appliances in their homes, often from remote locations. Increasingly, consumers are incorporating Internet of Things (IoT)-enabled devices into their homes, allowing them to control the temperature, lighting, locks, and other gadgets from their smartphones or computers and allowing the devices to communicate across a local area network, such as one found in a consumer's home.

While network-addressable devices are surging in popularity, they are primarily articles of convenience and are used by a specific user group of technology-focused individuals. Most manufacturers and retailers of these devices have yet to successfully diversify their audiences, targeting tech-savvy members of a household while overlooking other categories of potential consumers. Further, many consumers choose to adopt network-addressable systems for security, energy-efficiency, and cost-saving purposes. Thus far, few of a consumer's experiences with network-addressable technology have been entertainment-based.

SUMMARY

Described embodiments enable the integration of network-addressable technologies with user narration of a book to create a cinematic storytelling experience. A user uses an application on a client device to select a story from a story database and download the story, an associated lexicon, and coordination instructions. After selecting the story, in some embodiments the user is given the option to create a custom smart home animation for the story.

If the user elects not to create a custom animation for the story, the system uses a pre-made set of coordination instructions supplied by a publisher or third party to create the cinematic experience. When the user begins narration of the selected story, a voice recognition module listens and receives input via the microphone on the user's client device. A computer model is run against the input to determine a likelihood that a word spoken by the user is a keyword. If the model determines that a word is a keyword, a rules module matches the keyword to a rule and retrieves a corresponding instruction directing at least one network-addressable device to carry out one or more designated actions. The rules module sends the instruction to a control module, which consults an inventory of the user's network-addressable devices to determine whether the device associated with the designated action is included in the inventory. If the device is included in the inventory, the control module sends an instruction to the device to carry out the designated action(s).

If the user elects to create custom coordination instructions, the user uses an effects module on the application to assign various smart home effects to different portions of the story. When the user begins narration of the selected story and reaches a word or phrase to which the user has assigned a custom coordination instruction, the control module sends an instruction to the corresponding network-addressable device to perform the action(s) associated with the instruction.

The disclosed embodiments include a computer-implemented method, a system, and a non-transitory computer-readable medium. The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features that will be more readily apparent from the detailed description and the accompanying figures. A brief introduction of the figures is below.

FIG. 3 is an interaction diagram illustrating the interaction between a book, a client application, a server facility, and a network-addressable device, according to an embodiment.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (and method) for purposes of illustration only. One skilled in the art will readily recognize from the following description that alternative embodiments of the structures and methods illustrated herein may be employed without departing from the principles described herein.

Figure 1:
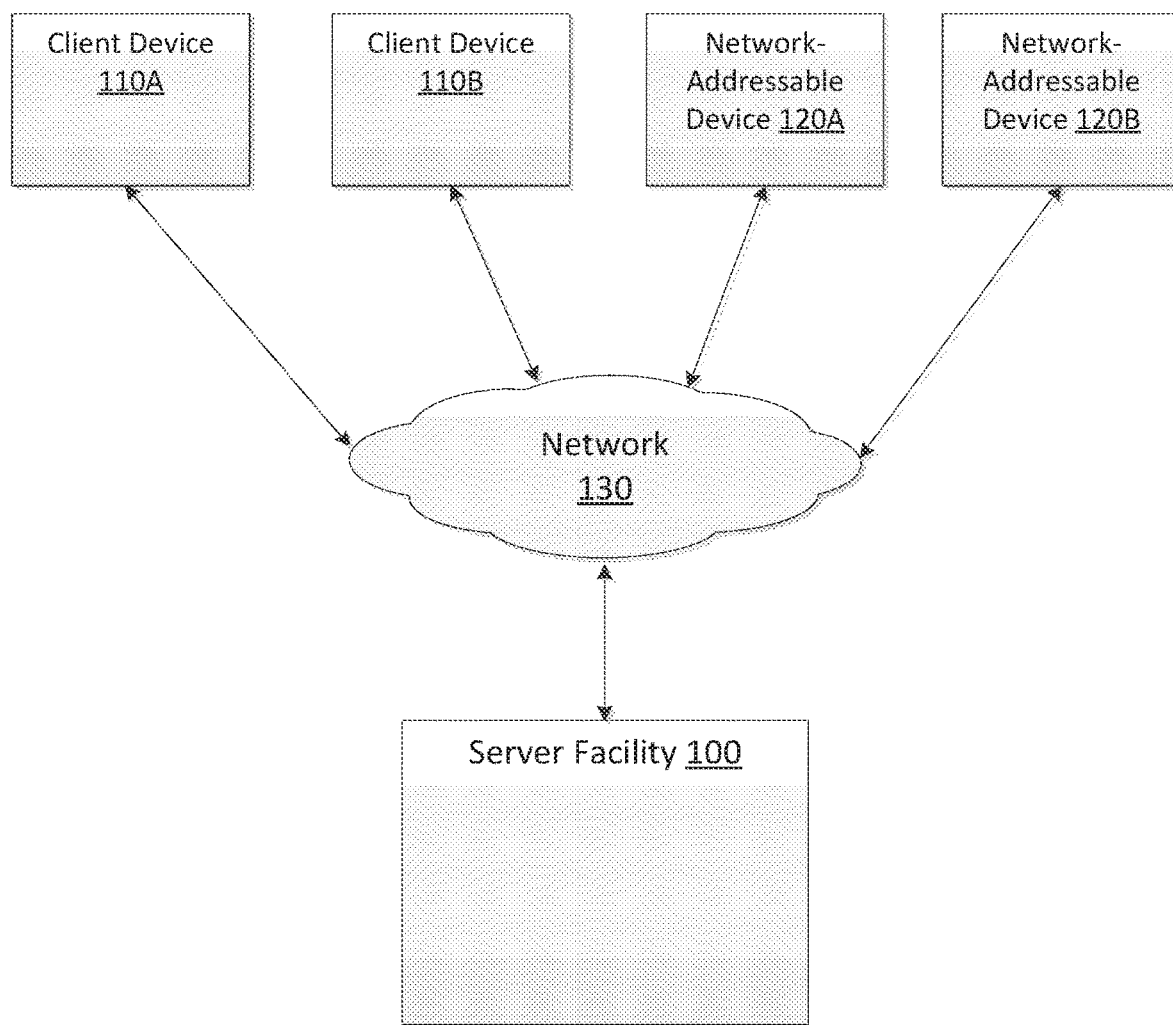
FIG. 1 is a block diagram illustrating a system architecture for creating a cinematic storytelling experience using network-addressable technologies, according to an embodiment.

FIG. 1 is a block diagram illustrating a system view of a server facility 100 for creating a cinematic storytelling experience using network-addressable technologies, in accordance with one embodiment. The system is scalable to accommodate multiple users/viewers that use client devices 110 to interact with the server facility 100. While only two client devices 110A and 110B are shown, it is understood that very large numbers (e.g., millions) of client devices are supported and can be in communication with the server facility 100 at any time.

Each client device 110 is used by a user to communicate with the server facility 100. Examples of client devices 110 include any type of computer device, such as a mobile telephone, a smartphone, a tablet, a personal digital assistant, an IP enabled video player, or a personal computer (e.g., desktop, notebook, laptop) computer. In other embodiments, the client device 110 is a voice-activated home product such as a Google Home device or Amazon Echo.

Also connected to the server facility 100 through the network 130 are network-addressable devices 120. Network-addressable devices 120 include thermostats, cameras, lights, locks, and other devices that are connected across a home network and are capable of being controlled remotely via the client devices 110. While only two network-addressable devices 120A and 120B are shown, it is understood that very large numbers (e.g., millions) of network-addressable devices are supported and can be in communication with the server facility 100 at any time. In one embodiment, network-addressable devices 120 use a unified operating system such as Google's Brillo IoT platform and communicate via a cross-platform common language such as Google's Weave™ platform.

The server facility 100 communicates with one or more client devices 110 and one or more network-addressable devices 120 via a network 130. The network 130 enables communications between the client device 110 and the server facility 100, between the network-addressable devices 120 and the server facility 100, and between the client device 110 and the network-addressable devices 120. In one embodiment, the network 130 is the Internet or a mobile network that connects mobile devices to the Internet, and uses standardized internetworking communications technologies and protocols, known now or subsequently developed, that enable the client device 110 and the network-addressable devices 120 to communicate with the server facility 100 and with each other. In another embodiment, the network 130 is a cloud computing network and includes one or more components of the server facility 100. The client device 110, the network-addressable device 120, and the server facility 100 are connected to the network 130 through network interfaces.

Client Device

Figure 2B:
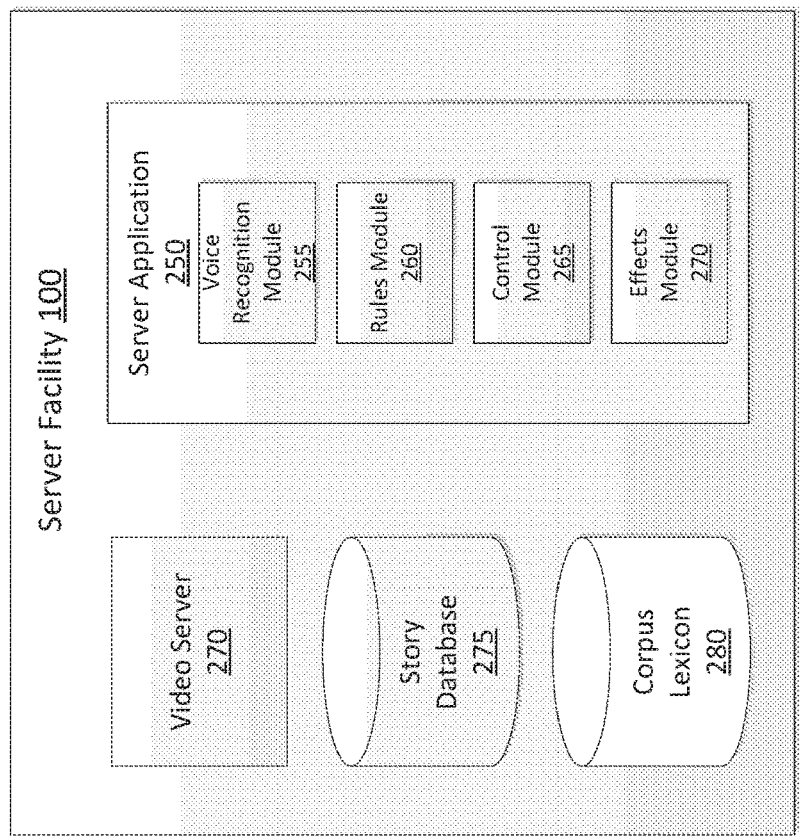
FIG. 2B is a block diagram illustrating an embodiment of the server facility shown in FIG. 1.
Figure 2A:
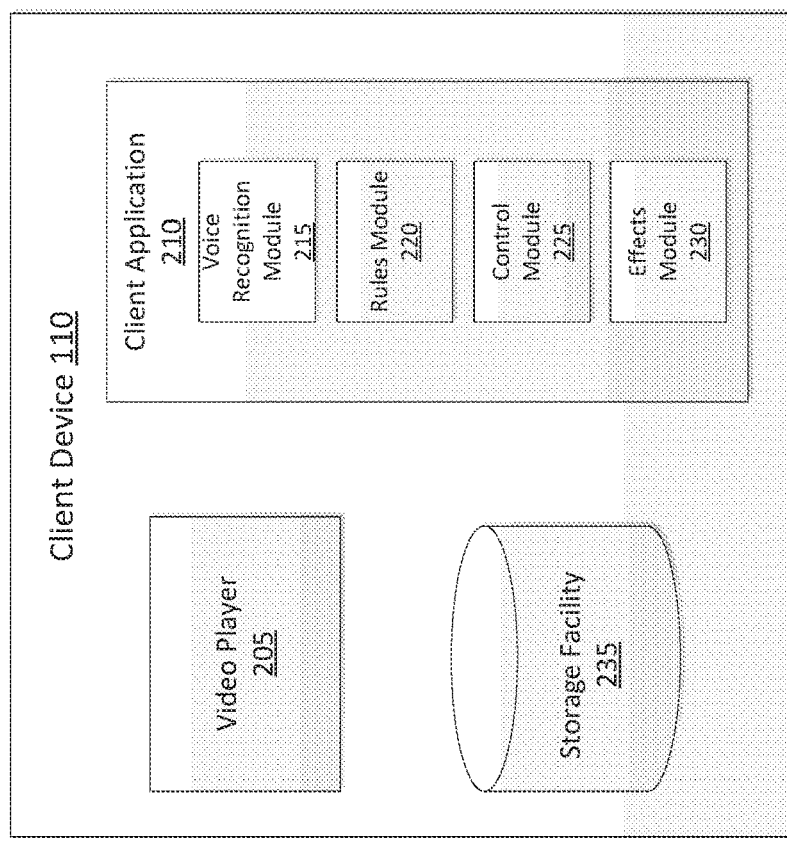
FIG. 2A is a block diagram illustrating an embodiment of the client device shown in FIG. 1.

As shown in FIG. 2A, the client device 110 includes a client application 210 and a storage facility 235, such as a hard drive or flash memory device, to which the client device 110 stores data used by the user in performing tasks. The client device 110 also typically includes a processor, a display device (or output to a display device), and a network interface for coupling to the server facility 100 via the network 130.

In some embodiments, the client device 110 includes a video player 205. The video player 205 is used for viewing a video stream. The video player 205 may be a standalone application, or a plug-in to another application such as a network browser. The video player 205 includes user interface controls (and corresponding application programming interfaces) for selecting a video feed, starting, stopping, and rewinding a video. Also, the video player 205 can include in its user interface a video display format selection configured to indicate which video display format (e.g., a two-dimensional (2D) video or a three-dimensional (3D) video). Other types of user interface controls (e.g., buttons, keyboard controls) can be used as well to control the playback and video format selection functionality of the video player 205.

The client device 110 also includes a client application 210 downloaded through the network 130. In another embodiment, the client application 210 is pre-loaded on the client device 110 such that the user of the client device 110 need not download the client application 210 separately. In one embodiment, when the user downloads the client application 210 onto the client device 110, the user is asked to input information about the network-addressable devices in the user's home or surrounding area. For example, a user might tell the application that the user has a smart thermostat and a wireless music system in the living room and color changing smart bulbs and a wireless fan in the bedroom. In another embodiment, a control module 225 on the client device 110 detects network-addressable devices within a specific radius by searching for devices that use a unified operating system such as Google's Brillo system and a cross-platform common language such as Google's Weave® platform.

In situations in which the systems discussed here collect personal information about users, or may make use of personal information, the users may be provided with an opportunity to control whether programs or features collect user information (e.g., information about a user's social network, social actions or activities, profession, a user's preferences, a user's current location, or devices within a specific radius of the client device 110), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user may have control over how information is collected about the user and used by a content server.

The client application 210 is used to download new story experiences from the server facility 100 and to choreograph cues and effects associated with each story. The user of the client device 110 downloads a story from a story database 275 (FIG. 2B) onto the client device 110 through the client application 210. When the user downloads the story, in various embodiments a lexicon and a set of pre-made coordination instructions associated with the story are included in the download, and the user in some embodiments is given the option to create a custom set of coordination instructions. The story, the lexicon, and any pre-made and/or custom coordination instructions are stored in the storage facility 235, such that the client device 110 need not be connected to the server facility 100 to begin the cinematic storytelling experience. In one embodiment, the download also includes a video of a content provider narrating the story.

The client application 210 includes a voice recognition module 215, a rules module 220, a control module 225, and an effects module 230. The voice recognition module 215 listens to user narration of the selected story and receives the narration as input via the microphone on the client device 110. In one embodiment, the user input is playback of the video containing the content provider's narration of the story.

Referring still to FIG. 2A and also to FIG. 2B, for each story stored in the story database 275, a corresponding lexicon is stored in a corpus lexicon 280 and a set of pre-made coordination instructions supplied by the publisher of the story or a third party is stored in the story database 275. The lexicon contains a list of all of the words in the story, including a subset of the words that are designated keywords. In various embodiments, a story's lexicon also contains the total number of words in the story and the corresponding numbers of each keyword. For example, the lexicon for "The Tell-Tale Heart" by Edgar Allen Poe might indicate that the story contains a total of 2093 words and that words 72, 268, 599, 1362, 1987, and 2045 are keywords. In one embodiment, each keyword is a single word in the lexicon. In another embodiment, a keyword is a phrase. In still other embodiments, the keywords may be a combination of single words and phrases. Each keyword is associated with at least one specific instruction directing one or more network-addressable devices to perform at least one action responsive to detection of the keyword. The specific instructions for each story are stored together as a set of coordination instructions in the story database 275. For example, a set of coordination instructions for a ghost story might include the following:

TABLE 1

Coordination Instructions

| Keyword | Network-addressable Device | Instruction |
| --- | --- | --- |
| Dark | Smart lights | Gradually dim smart lights until off |
| Wind | Smart fan | Set fan to low |
| howled | Wireless stereo system | Play howling noise for 5 seconds |
| Thunder | Wireless stereo system | Play thunder clap after 10 second delay |
| Cold | Smart thermostat | Lower temperature in 1-degree increments until temperature reaches 60 degrees |

In some embodiments, the user elects to create a custom set of coordination instructions to animate the story. Upon opening the client application 210 and selecting the story, the user interacts with the effects module 230 to assign various effects to different parts of the story. The effects module 230 presents on the client device 110 the text of the selected story. In some embodiments, the effects module 230 indicates which words are listed as keywords in the pre-made set of coordination instructions (e.g., by holding or underlining the keywords).

The effects module 230 also displays on the client device 110 a list of pre-made building blocks from which the user can select. For example, the building blocks may contain light patterns such as flickering, fade on, fade off, lighting effect, color controls, etc. Building blocks related to sound effects might include thunder, heartbeats, doorbells, screams, etc. And building blocks related to network-addressable appliances might include control of smart outlets, temperature control, and fan control (e.g., on/off, speed control).

The user provides input to the effects module 230 in selecting from the list of pre-made building blocks. In one embodiment, the user uses a drag and drop interaction to assign building blocks to words in the story. Alternatively, the user may select building blocks by clicking on an entry in a list of available effects. In some embodiments, the building blocks are assigned to the keywords. Additionally or alternatively, the user may elect to assign the building blocks to words that are not designated keywords in the pre-made set of coordination instructions. In one embodiment, multiple building blocks are assigned to a single word. In another embodiment, a single building block is assigned to multiple words. Responsive to receiving the user input, the effects module 230 consolidates the building blocks into a custom set of coordination instructions and sends the custom coordination instructions for storage on the storage facility 235. The user may create multiple sets of custom coordination instructions for each story.

When the user opens the client application 210 and selects a story, the effects module 230 displays on the client device 110 an option to use the pre-made coordination instructions associated with the story or a set of custom coordination instructions.

If the user elects to use the pre-made set of coordination instructions and begins narration of the selected story, the voice recognition module 215 interprets the user input and determines whether the input contains words in the story lexicon and, more specifically, whether the input contains a keyword. The voice recognition module 215 is trained to interpret the user input by matching audio profiles of keywords to the user input to detect recitation of a keyword.

The voice recognition module 215 is a text-to-speech system that uses a language model and an acoustic model to convert the user input to written text and compare the text to a story lexicon. The language model contains a list of words and their probability of occurring in a given sequence, and the acoustic model contains a statistical representation of the distinct sounds that comprise each word in the language model. The acoustic model is trained using a set of audio recordings and their corresponding transcripts. For each word included in a story's lexicon, the voice recognition module 215 receives as input hundreds or thousands of iterations of the word to account for variations in accents, dialects, regional differences, and the like. Over time, variations in pronunciation will lead to greater certainty in recognizing a particular word and will increase the speed with which the voice recognition module 215 is able to perform the detection. Additional or alternative methods for training voice recognition modules are well known in the art.

An audio profile of each keyword is stored with a story's lexicon in the corpus lexicon 280. In one embodiment, the voice recognition module 215 does not perform a full speech-to-text analysis of the user input. Rather, the voice recognition module 215 employs a matching algorithm to match the audio profile of a story's keywords with the audio profile of the user input as the user narrates the story. Alternatively, the voice recognition module 215 performs a full speech-to-text analysis and compares the text of the narration with the keywords to determine whether the user input contained a keyword.

Suitable examples of speech-to-text engines include Google Cloud Speech, Google Web Speech, and Android Speech. Alternative speech-to-text engines may be adapted to operate according to the teachings disclosed herein. In either embodiment, detection by the voice recognition module 215 is improved if the voice recognition module 215 narrows the matching algorithm based on a temporal understanding of the user's location in the story as discussed below.

In another embodiment, the voice recognition module 215 detects the point in the story at which the user is located based on the number of words that the user has read, the location of the keywords, and the total number of words in the story. The voice recognition module 215 retrieves the story's lexicon from the corpus lexicon 280 and counts the number of words contained in the user input. When the voice recognition module 215 reaches a numbered word corresponding to a keyword, the voice recognition module 215 classifies the input as a match for the keyword. In some embodiments, the user exits the application before completing the story, and the voice recognition module 215 saves the user's place such that when the user resumes narration, the voice recognition module 215 detects the user's position in the story. If the user resumes narration from the beginning of the story instead of the place where he previously left off, the voice recognition module 215 detects that the user input does not correspond to the expected position and uses the matching algorithm to match the audio profile of the user input with the audio profiles of the words in the lexicon to determine the user's position.

When a user selects a story from the story database 275, the voice recognition module 215 retrieves the corresponding lexicon from the corpus lexicon 280, and recognition of the user input is restricted to the words contained in the lexicon. Restricting the applicable lexicon based on user selection of a story significantly increases the probability that the voice recognition module 215 will accurately interpret the user input and increases the speed at which the voice recognition module 215 operates.

Responsive to receiving the user input, the voice recognition module 215 runs the computer model against the input to determine a score indicating the probability that the user input corresponds to a keyword. The highest scoring keyword match above a threshold is designated by the voice recognition module 215 as the match for the user input. The voice recognition module 215 then sends the keyword to the rules module 220 for analysis.

If the user elects to use a set of custom coordination instructions, the voice recognition module 215 interprets the user input and determines whether the input contains words in the story lexicon and, more specifically, whether the input contains a word or phrase for which the user designated a custom coordination instruction. The voice recognition module 215 performs interpretation of the user input in the same manner described above with respect to the pre-made set of coordination instructions.

After interpreting the user input as a word stored in a story's lexicon, the voice recognition module 215 provides the interpretation to the rules module 220 for processing. The rules module 220 coordinates the cues and effects associated with each story. Responsive to receiving the output from the voice recognition module 215, the rules module 220 accesses and analyzes the pre-made or custom coordination instructions to determine the at least one specific network-addressable device instruction that corresponds to the detected keyword.

The rules module 220 then sends the at least one coordination instruction corresponding to the keyword to the control module 225 for communication to the network-addressable devices 120.

The control module 225 receives the coordination instruction(s) from the rules module 220 and instructs the network-addressable devices 120 to perform the action(s) corresponding to the keyword. In one embodiment, the instruction is to perform the action immediately after the control module 225 provides the instruction to the network-addressable device 120. Additionally or alternatively, the instruction may be to perform the action at a later point in the story or to perform an action multiple times over the course of the story.

The control module 225 compares the received coordination instruction for a keyword with a list of the network-addressable devices in the user's home or surrounding area as determined by user input or detection by the control module 225. If the coordination instruction contains an instruction corresponding to a network-addressable device that is within a specified radius of the client device 110, the control module 225 instructs the network-addressable device to execute the instruction. For example, if the coordination instruction requires smart lights to turn blue, the control module 225 sends the instruction if it determines that smart lights are present within a specified radius of the client device. In one embodiment, the control module 225 communicates with the network-addressable devices 120 via a communication platform such as Google's Weave™ platform. If the coordination instruction contains an instruction corresponding to a network-addressable device that is not within a certain radius of the client device 110, the control module 225 skips the instruction in one embodiment.

For example, assume a user selects the story "The Tell-Tale Heart" from the story database 275. The download onto the user's client device 110 includes a story file, a lexicon containing a list of the words and keywords in the story, and a set of pre-made coordination instructions corresponding to the keywords. If the user elects not to use a set of custom coordination instructions, when the user of the client device 110 begins reading the story aloud, the voice recognition module 215 receives the input and applies a matching algorithm to determine whether the input corresponds to a keyword. In some embodiments, the voice recognition module 215 narrows the matching algorithm based on a temporal understanding of the user's location in the story, as discussed above. Based on the results of the matching algorithm, the voice recognition model 215 determines a score indicating the probability that the input corresponds to a keyword and selects the highest scoring keyword match above a threshold as the match for the user input. The voice recognition module 215 then sends the keyword to the rules module 220, which compares the keyword to the coordination instructions and sends the corresponding coordination instruction to the control module 225 for communication to the network-addressable device 120.

For example, the pre-made set of coordination instructions for The Tell-Tale Heart may include an instruction that when a user says the keyword "darkness," the lights in the room should go out, or an instruction that when the user says "beating," the sound system in the room should make a loud beating noise. In other embodiments, different keywords in the same story trigger the same instruction or one keyword triggers multiple actions. In still another embodiment, a keyword triggers a network-addressable device 120 to take an action that develops over the course of a sentence, a paragraph, or the entire story. For example, the coordination instructions for the Tell-Tale Heart may include an instruction that when a user says the keyword "beating," the sound system in the room starts making a slow and quiet beating noise that becomes faster and louder as the story progresses. If, for example, the coordination instructions include an instruction that when a user says the keyword "cold," the thermostat lowers the temperature in the room, but there is not a smart thermostat within a specified radius of the client device 110, the control module 225 will skip the instruction.

In one embodiment, some functionality attributed to the client application 210 may be performed on the server facility 100. If greater processing is required than is capable of being performed on the client device 110, the request is sent over the network 130 to the server facility 100 to be performed on a server application 250. Additionally or alternatively, the server application 250 may perform some or all of the tasks affiliated with the client application 120, as described below.

The client device 110 also includes a storage facility 235 that stores user-selected stories downloaded onto the client device 110 through a server application 250. The storage facility 235 also stores the coordination instructions and the lexicon associated with the selected story as well as a video of a content provider narrating the story. When the user of the client device 110 opens the application to initiate the cinematic storytelling experience, the client application 210 retrieves the story and associated information from the storage facility 235.

Server Facility

FIG. 2B is a block diagram of a server facility 100 for creating a cinematic storytelling experience using network-addressable technologies. As illustrated in FIG. 2B, the server facility 100 includes a server application 250, a video server 270, a story database 275, and a corpus lexicon 280. Other conventional features, such as firewalls, load balancers, application servers, failover servers, site management tools, and so forth are not shown as to more clearly illustrate the features of the system. Examples of a suitable server facility 100 for implementation of the system include the YouTube™ and Google Video™ websites; other video hosting sites are known as well, and can be adapted to operate according to the teaching disclosed herein. It will be understood that the term "website" represents any system and method of providing content and is not intended to be limited to systems that support content provided via the Internet or the HTTP protocol. The various servers are conventionally implemented, whether as a single piece of software or hardware or as multiple pieces of software or hardware and can couple to the network 130 via the server application 250. In general, functions described in one embodiment as being performed on the server side can also be performed on the client side in other embodiments if appropriate.

Like the client application 210, the server application 250 includes a voice recognition module 255, a rules module 260, a control module 265, and an effects module 270. In one embodiment, the server application 250 receives user queries for videos. In response to a user query, the server application 250 accesses the story and associated coordination instructions from the story database 275 and the lexicon from the corpus lexicon 280. In one embodiment, the server application 250 facilitates download of the story, the coordination instructions, and the lexicon onto the client device 110. In another embodiment, the story, the coordination instructions, and the lexicon remain stored on the server facility 100 during the cinematic storytelling experience and the server application 250 performs the tasks affiliated with the client application 210 described above. In still another embodiment, creation of the cinematic storytelling experience is performed by both the client application 210 and the server application 250.

The video server 270 receives uploaded media content from content providers and allows content to be viewed on the client device 110. Content may be uploaded to the video server 270 via the Internet from a personal computer, through a cellular network from a telephone or PDA, or by other means for transferring data over the network 130 known to those of ordinary skill in the art. Content may be downloaded from the video server 270 in a similar manner; in one embodiment media content is provided as a file download to a client device 110; in an alternative embodiment, media content is streamed to the client device 110. The means by which media content is received by the video server 270 need not match the means by which it is delivered to the client device 110. For example, a content provider may upload a video via a browser on a personal computer, whereas the client device 110 may view that video as a stream sent to a PDA. Note also that the video server 270 may itself serve as the content provider.

The story database 275 stores stories and associated metadata, provided by their respective content owners. The story files have metadata associated with each file, such as a story ID, author, title, label, genre, and length.

The story database 275 also stores pre-made coordination instructions associated with each story that dictate the use of network-addressable devices 120 in the cinematic storytelling experience. For example, assume that a father is reading a story to his son about a small boat traversing the ocean. The coordination instructions may provide that when the voice recognition module 215 detects the keyword "calm" or "peaceful," the smart lights in the room should glow blue and green. The sky grows dark as the story progresses. When the father reads the keyword "storm," the smart speakers in the room switch from calm music and ocean sounds to an ominous score and loud winds. Finally, upon detecting the combination of the keywords "lightening" and "strikes," the server application 250 instructs the smart lights in the room to flash yellow and the speakers to produce a thunder clap.

For each story in the story database 275, the corpus lexicon 280 stores a lexicon containing the words used in the story. The voice recognition module 215 is trained to recognize a limited number of keywords for each story, as described above in conjunction with FIG. 1. Restricting the applicable lexicon increases the probability that the voice recognition module 215 will accurately interpret user input for a story and increases the speed at which the recognition is performed. In some embodiments, recognition speed and accuracy is also improved by narrowing the matching algorithm based on a temporal understanding of the user's location in the story such that the lexicon of possible words is based on the location.

Interaction Diagram

FIG. 3 is an interaction diagram illustrating an example process for creating a cinematic storytelling experience with network-addressable technologies. In the displayed embodiment, creation of the cinematic experience is performed on the client application 210. In other embodiments, the process occurs on the server facility 100 or on both the client application 210 and the server facility 100.

The user of the client device 110 opens the client application 210 and interacts with the server application 250 on the server facility 100 to select 302 a story from the story database 275. The server application 250 accesses the story and a set of pre-made coordination instructions from the story database 275 and the lexicon from the corpus lexicon 280. The client device 110 downloads 304 the story, the pre-made coordination instructions, and the lexicon from the server facility 100. In one embodiment, the download includes a video of a content provider narrating the selected story. In another embodiment, the video server 270 streams a video to the client device 110.

The client application 210 displays on the client device 110 an option to create a set of custom coordination instructions. In some embodiments, the user assigns pre-made building blocks associated with light patterns, sound effects, and appliance controls to animate various portions of the story and create the custom coordination instructions. In other embodiments, the user elects not to create custom coordination instructions and instead uses the pre-made set of coordination instructions supplied by the publisher or a third party.

The client application 210 detects 306 user narration of the selected story. In one embodiment, the user reads aloud from the downloaded story file stored in the storage facility 235. In another embodiment, the narration comprises the user reading from a physical version of the story separate from the client device 110 (e.g., a book, a magazine, another client device, etc.). In still another embodiment, the narration comprises playback of a video file in which a content provider narrates the story.

The various components of the client application 210 analyze 308 the narration and instruct the network-addressable devices 120 to perform an action responsive to detecting recitation of a keyword. The voice recognition module 215 uses speech-to-text technology to interpret the user input as corresponding to a keyword and provides the interpretation to the rules module 220 for processing. Technology for performing speech-to-text is widely available and an appropriate method may be chosen by the implementer for performing this function. In embodiments where the user has created custom coordination instructions, recognition of the user input proceeds in the same manner.

The rules module 220 accesses the pre-made and custom coordination instructions from the storage facility 235 and compares the coordination instructions with the received keyword to determine the applicable instruction(s). The rules module 220 then communicates the applicable instruction to the control module 225, which determines whether the corresponding network-addressable device 120 is located within a specified radius of the client device 110. If the control module 225 determines that the network-addressable device 120 is located within the specified radius, the control module 225 instructs 310 the network-addressable device 120 to perform the at least one action associated with the instruction. In one embodiment, the instruction directs one network-addressable device 120 to perform one action. In other embodiments, the instruction directs multiple network-addressable devices 120 to perform an action or directs one network-addressable device 120 to perform multiple actions. At 312, the network-addressable device 120 executes the instruction.

Figure 4:
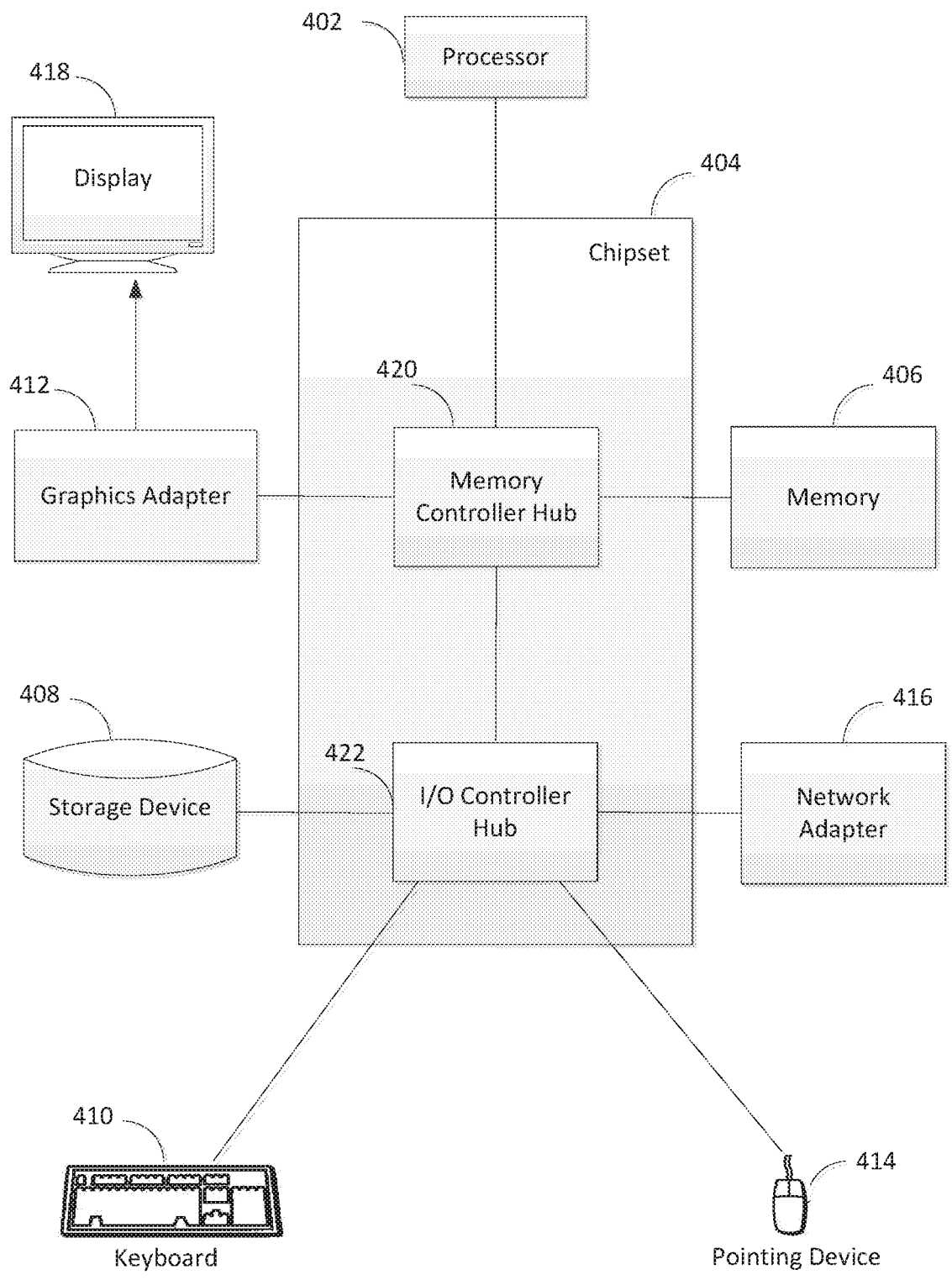
FIG. 4 is block diagram illustrating an example computer usable to implement entities of the cinematic storytelling environment, according to an embodiment.

The client 110 and the server facility 100 are each implemented using computers. FIG. 4 is a block diagram illustrating an example computer 400 usable to implement entities of the cinematic storytelling environment, in accordance with one embodiment. The example computer 400 has sufficient memory, processing capacity, network connectivity bandwidth, and other computing resources to implement the cinematic storytelling experience as described herein.

The computer 400 includes at least one processor 402 (e.g., a central processing unit, a graphics processing unit) coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, a keyboard 410, a pointing device 414, and a network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The processor 402 may include one or more processors 402 having one or more cores that execute instructions. The pointing device 414 is a mouse, touch-sensitive screen, or other type of pointing device, and in some instances is used in combination with the keyboard 410 to input data into the computer 400. The graphics adapter 412 displays media and other images and information on the display 418. The network adapter 416 couples the computer 400 to one or more computer networks (e.g., the network 130).

The computer 400 is adapted to execute computer program modules for providing functionality described herein including presenting media and/or metadata generation. As used herein, the term "module" refers to computer program logic used to provide the specified functionality. Thus, a module can be implemented in hardware, firmware, and/or software. In one embodiment of a computer 400 that implements the server facility 100, program modules such as the server application 250 and the video server 270 are stored on the storage device 408, loaded into the memory 406, and executed by the processor 402.

The types of computers 400 used by the entities of the cinematic storytelling environment can vary depending on the embodiment and the processing power required by the entity. For example, the client device 110 is a smart phone, tablet, laptop, or desktop computer. In other embodiments, the client device 110 is a voice-activated home product such as a Google Home device or Amazon Echo. As another example, the server facility 100 might comprise multiple blade servers working together to provide the functionality described herein. The computers 400 may contain duplicates of some components or may lack some of the components described above (e.g., a keyboard 410, a graphics adapter 412, a pointing device 414, a display 418). For example, the server facility 100 can run in a single computer 400 or multiple computers 400 communicating with each other through a network such as in a server farm.

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   receiving, via a user interface on a client device, a user selection of a story to be recited as a verbal narration of a book with sound effects providing animation of the selected story;
   obtaining, from a server, (i) a lexicon associated with the selected story, the lexicon comprising a limited number of keywords and data indicating a location of each keyword within the selected story, and (ii) information identifying actions associated with the selected story, wherein at least one action of the identified actions is to play, responsive to the client device detecting at least one keyword of the limited number of keywords during a verbal recitation of the selected story, audio content with a sound effect that animates an event described by the at least one keyword;
   receiving user input to initiate verbal recitation of the selected story;
   detecting the at least one keyword during the verbal recitation of the selected story, wherein each of the at least one keyword is detected based on the lexicon associated with the selected story, respective one or more words from the selected story that are being verbally recited, and a location of the respective one or more words within the selected story; and
   performing, by a processing device, the at least one action responsive to detecting the at least one keyword during the verbal recitation of the selected story, wherein the at least one action comprises playing the audio content with the sound effect that animates the event described by the at least one keyword in the selected story.

2. The computer-implemented method of claim 1, wherein the client device is a voice activated home assistant device.

3. The computer-implemented method of claim 1, wherein the lexicon further comprises a total number of words in the selected story, wherein data indicating the location of each keyword within the selected story is represented by a word count associated with a respective keyword in view of the total number of words, and wherein detecting the at least one keyword further comprises:
   sending data defining the verbal recitation of the selected story to the server, the sent data comprising locations of respective verbally recited words within the selected story, wherein each location is represented by a corresponding word count; and
   receiving from the server correspondence between the data defining the verbal recitation of the selected story and the at least one keyword.

4. The computer-implemented method of claim 1, wherein the detecting comprises using a matching algorithm to match an audio profile of the at least one keyword with an audio profile of the user input.

5. The computer-implemented method of claim 1, wherein the verbal recitation comprises playback of a recorded narration of the story, the recorded narration received from the server in response to the user selection of the story.

6. The computer-implemented method of claim 1, wherein the verbal recitation is a narration of the selected story by a user of the client device, and wherein the narration of the selected story is received via a microphone of the client device.

7. The computer-implemented method of claim 1, wherein the at least one action is performed at a plurality of points in the story, and wherein a sound characteristic of the sound effect provided by the at least one action changes across the plurality of points in the story.

8. A computer system, comprising:
   a memory; and
   a processing device, coupled to the memory, to:
   receive, via a user interface on a client device, a user selection of a story to be recited as a verbal narration of a book with sound effects providing animation of the selected story;
   obtain, from a server, (i) a lexicon associated with the selected story, the lexicon comprising a limited number of keywords and data indicating a location of each keyword within the selected story, and (ii) information identifying actions associated with the selected story, wherein at least one action of the identified actions is to play, responsive to the client device detecting at least one keyword of the limited number of keywords during a verbal recitation of the selected story, audio content with a sound effect that animates an event described by the at least one keyword;
   receive user input to initiate verbal recitation of the selected story;

detect the at least one keyword during the verbal recitation of the selected story, wherein each of the at least one keyword is detected based on the lexicon associated with the selected story, respective one or more words from the selected story that are being verbally recited, and a location of the respective one or more words within the selected story; and perform the at least one action responsive to detecting the at least one keyword during the verbal recitation of the selected story, wherein the at least one action comprises playing the audio content with the sound effects that animates the event described by the at least one keyword in the selected story.

9. The system of claim 8, wherein the client device is a voice activated home assistant device.

10. The system of claim 8, wherein the lexicon further comprises a total number of words in the selected story, wherein data indicating the location of each keyword within the selected story is represented by a word count associated with a respective keyword in view of the total number of words, and wherein to detect the at least one keyword, the processing device is further to:

send data defining the verbal recitation of the selected story to the server, the sent data comprising locations of respective verbally recited words within the selected story, wherein each location is represented by a corresponding word count; and receive from the server correspondence between the data defining the verbal recitation of the selected story and the at least one keyword.

11. The system of claim 8, wherein to detect the at least one keyword, the processing device is further to:

use a matching algorithm to match an audio profile of the at least one keyword with an audio profile of the user input.

12. The system of claim 8, wherein the verbal recitation comprises playback of a recorded narration of the story, the recorded narration received from the server in response to the user selection of the story.

13. The system of claim 8, wherein the verbal recitation is a narration of the selected story by a user of the client device, and wherein the narration of the selected story is received via a microphone of the client device.

14. The system of claim 8, wherein the at least one action is performed at a plurality of points in the story, and wherein a sound characteristic of the sound effect provided by the at least one action changes across the plurality of points in the story.

15. A non-transitory computer-readable medium storing computer-executable instructions that, in response to execution, cause a processing device to perform operations comprising:

receiving, via a user interface on a client device, a user selection of a story to be recited as a verbal narration of a book with sound effects providing animation of the selected story;

obtaining, from a server, (i) a lexicon associated with the selected story, the lexicon comprising a limited number of keywords and data indicating a location of each keyword within the selected story, and (ii) information identifying actions associated with the selected story, wherein at least one action of the identified actions is to play, responsive to the client device detecting at least one keyword of the limited number of keywords during a verbal recitation of the selected story, audio content with a sound effect that animates an event described by the at least one keyword;

receiving user input to initiate verbal recitation of the selected story;

detecting the at least one keyword during the verbal recitation of the selected story, wherein each of the at least one keyword is detected based on the lexicon associated with the selected story, respective one or more words from the selected story that are being verbally recited, and a location of the respective one or more words within the selected story; and performing the at least one action responsive to detecting the at least one keyword during the verbal recitation of the selected story, wherein the at least one action comprises playing the audio content with the sound effects that animates the event described by the at least one keyword in the selected story.

16. The non-transitory computer-readable medium of claim 15, wherein the client device is a voice activated home assistant device.

17. The non-transitory computer-readable medium of claim 15, wherein the lexicon further comprises a total number of words in the selected story, wherein data indicating the location of each keyword within the selected story is represented by a word count associated with a respective keyword in view of the total number of words, and wherein detecting the at least one keyword further comprises:

sending data defining the verbal recitation of the selected story to the server, the sent data comprising locations of respective verbally recited words within the selected story, wherein each location is represented by a corresponding word count; and receiving from the server correspondence between the data defining the verbal recitation of the selected story and the at least one keyword.

18. The non-transitory computer-readable medium of claim 15, wherein the detecting comprises using a matching algorithm to match an audio profile of the at least one keyword with an audio profile of the user input.

19. The non-transitory computer-readable medium of claim 15, wherein the verbal recitation comprises playback of a recorded narration of the story, the recorded narration received from the server in response to the user selection of the story.

20. The non-transitory computer-readable medium of claim 15, wherein the verbal recitation is a narration of the selected story by a user of the client device, and wherein the narration of the selected story is received via a microphone of the client device.

\* \* \* \* \*